(12) United States Patent
Liang et al.

(10) Patent No.: US 7,747,553 B2
(45) Date of Patent: Jun. 29, 2010

(54) RULE SET PARTITIONING BASED PACKET CLASSIFICATION METHOD FOR INTERNET

(75) Inventors: Zhi Yong Liang, Beijing (CN); Yonghua Lin, Beijing (CN); Kai Zheng, Beijing (CN); Yi Ge, Beijing (CN); Yan Qi Wang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/343,991

(22) Filed: Jan. 31, 2006

(65) Prior Publication Data

US 2008/0243748 A1   Oct. 2, 2008

(30) Foreign Application Priority Data

Jan. 31, 2005   (CN)   ................. 2005 1 0005083

(51) Int. Cl.
*G06F 17/00* (2006.01)
*G06N 5/02* (2006.01)

(52) U.S. Cl. ...................................................... 706/47
(58) Field of Classification Search ................ None
See application file for complete search history.

(56) References Cited

U.S. PATENT DOCUMENTS

| | | | | |
|---|---|---|---|---|
| 6,529,508 | B1 | 3/2003 | Li et al. | 370/392 |
| 6,763,394 | B2 | 7/2004 | Tuck, III et al. | 709/238 |
| 6,768,992 | B1 | 7/2004 | Jolitz | 707/6 |
| 6,778,984 | B1 | 8/2004 | Lu et al. | |
| 2002/0023080 | A1* | 2/2002 | Uga et al. | 707/1 |
| 2002/0023089 | A1 | 2/2002 | Woo | 707/101 |

(Continued)

FOREIGN PATENT DOCUMENTS

| | | |
|---|---|---|
| CN | 1545254 A | 11/2004 |
| EP | 1227630 A2 | 7/2002 |
| WO | 02/41572 A2 | 5/2002 |

OTHER PUBLICATIONS

'Packet Classification Using Multidimensional Cutting': Singh, Aug. 2003, SIGCOMM'03 ACM 1-58113-735.*

(Continued)

*Primary Examiner*—Donald Sparks
*Assistant Examiner*—Peter Coughlan
(74) *Attorney, Agent, or Firm*—Leonard Guzman, Esq.

(57) ABSTRACT

The present invention provides a rule set partitioning based packet classification method for Internet. The method comprising: performing Horizontal Cut for the rule set, determining the field for partitioning a rule layer based on a target algorithm and selecting the partition manner of the Horizontal Cut, performing Horizontal Cut according to the selected partition manner of the Horizontal Cut, thereby obtaining more than one rule layers, each rule layer being a Horizontal subset, combining the rule layers to obtain a plurality of Horizontal subsets according to the total number of the pre-designated Horizontal subsets and a predefined principle, wherein the total number of said combined plurality of Horizontal subsets equals to the total number of said pre-designated Horizontal subsets; performing Vertical Cut in each of the Horizontal subsets; then forming a Hash table that can index the Vertical subsets, so that it can be used in a lookup; and realizing rule storage in each Vertical subset respectively according to the target algorithm.

20 Claims, 7 Drawing Sheets

U.S. PATENT DOCUMENTS

| | | | |
|---|---|---|---|
| 2002/0152209 | A1 | 10/2002 | Merugu et al. .................. 707/7 |
| 2002/0186661 | A1 | 12/2002 | Santiago et al. ............. 370/202 |
| 2003/0118020 | A1 | 6/2003 | Calle et al. .................. 370/392 |
| 2004/1015422 | | 6/2004 | Sahni et al. .................. 370/351 |
| 2004/0205192 | A1 | 10/2004 | Olson et al. .................. 709/227 |
| 2004/0246899 | A1 | 12/2004 | Tuck, III et al. ............. 370/235 |

OTHER PUBLICATIONS

'Next generation routers': Chao, 2002, IEEE, 0018-9219, p. 1518-1558.*

'Packer classification for core routers: Is there an alternative to CAMs?': Baboescu, IEEE, 0-7803-7753-2, p. 53-63.*

J. Van Lunteren et al., "Fast an Scalable Packet Classification," IEEE Journal on Selected Areas in Communications, May 2003, pp. 560-571, vol. 21, No. 4.

K. Zheng et al., "An Ultra High Throughput and Power Efficient TCAM-Based IP Lookup Engine," IEEE INFOCOM, Mar. 2004, 11 pages.

Z. Liang et al., "A Scalable Parallel Lookup Framework Avoiding Longest Prefix Match," Lecture Notes in Computer Science, 2004, pp. 616-625, vol. 3090.

* cited by examiner

RULE SET PARTITIONING BASED PACKET CLASSIFICATION METHOD FOR INTERNET

TECHNICAL FIELD OF THE INVENTION

The present invention relates to a rule set pre-partitioning based packet classification method, in particular, to a method for partitioning the rule set in the Internet.

BACKGROUND OF THE INVENTION

In the field of Internet, the packet classification technology is a critical technology for many applications, such as Access Control List (ACL), Firewall, QoS (Quality of Service) control.

Packet classification can be regarded as a kind of special lookup/search problem. Packet classification needs to perform a search in a predefined rule set based on the information of an IP packet, so as to find the best matching rule and perform discarding, passing or other operation for the IP packet based on the action associated with the rule. In particular, a rule set is composed of multiple rules; generally, a rule comprises the following information: (source network address, destination network address, source port, destination port, protocol) and (priority, action). When classifying a packet, first the information (source address, destination address, source port, destination port, protocol) is extracted from an IP packet, and then a lookup is done in the rule set based on the extracted information to find a rule that matches the extracted information. Since there may be multiple matching rules, the rule with the highest priority will be selected as the best matching rule based on the priority information of the rule. Finally, corresponding operation is performed for the IP packet based on the action associated with the best rule.

In recent years, researchers have proposed a lot of algorithms and solutions to address the packet classification problem. These solutions can be divided into two categories: software based solutions and hardware based solutions. Software based solutions include the following algorithms: Modular, HiCut, HyperCut, EGT-PC, etc. Hardware based solutions mainly include the TCAM (Ternary Content Addressable Memory) based technology. Compared with the software solutions, the cost of the hardware solutions is expensive, flexibility in realization is poor, but lookup speed is very fast.

In [1] J. van Lunteren and T. Engbersen, "Fast and Scalable Packet Classification", IEEE Journal on Selected Areas in Communications, Vol. 21, No. 4, May 2003, there is proposed a TCAM-based fast packet classification solution in which respective fields of the rule are encoded. Wherein, the encoding technology uses the Horizontal Cut (H-Cut) method that is similar to the Range Interval Cut.

In [2] K. Zheng, C. C. Hu, H. B. Lu, and B. Liu, "An Ultra High Throughput and Power Efficient TCAM-Based IP Lookup Engine", Proc. IEEE INFOCOM '04, March 2004, there is proposed a fast route lookup solution. This solution is based on the TCAM technology, wherein, an ID Bit cut technology is applied to perform grouping for a route lookup rule base.

In [3] Z. Liang, K. Xu, J. Wu, "A Scalable Parallel Lookup Framework Avoiding Longest Prefix", Lectuer Notes in Computer Science, vol. 3090, 2004, pp. 616-625, there is provided a route lookup framework avoiding longest prefix match In the framework, a Prefix Level cut technology is applied to perform grouping for a route lookup rule set to eliminate the overlap between rules.

In [4] F. Baboescu, S. Singh, G. Varghese, "Packet Classification for Core Routers: Is there an alternative to CAMs?", Proc. of IEEE INFOCOM, San Francisco USA, 2003, there is provided a EGT-PC packet classification algorithm. The algorithm is based on a tree lookup structure and can realize the lookup performance that is comparable to the TCAM.

The lookup speed and memory requirement are two important performance parameters to evaluate a packet classification solution. The various software solutions mentioned in the above have drawbacks in these two aspects, either the lookup speed is not fast enough, or the memory requirement is very large.

Presently, the rule set partitioning methods can be divided into two kinds of methods.

Horizontal Cut (H-Cut)

Figure 1:
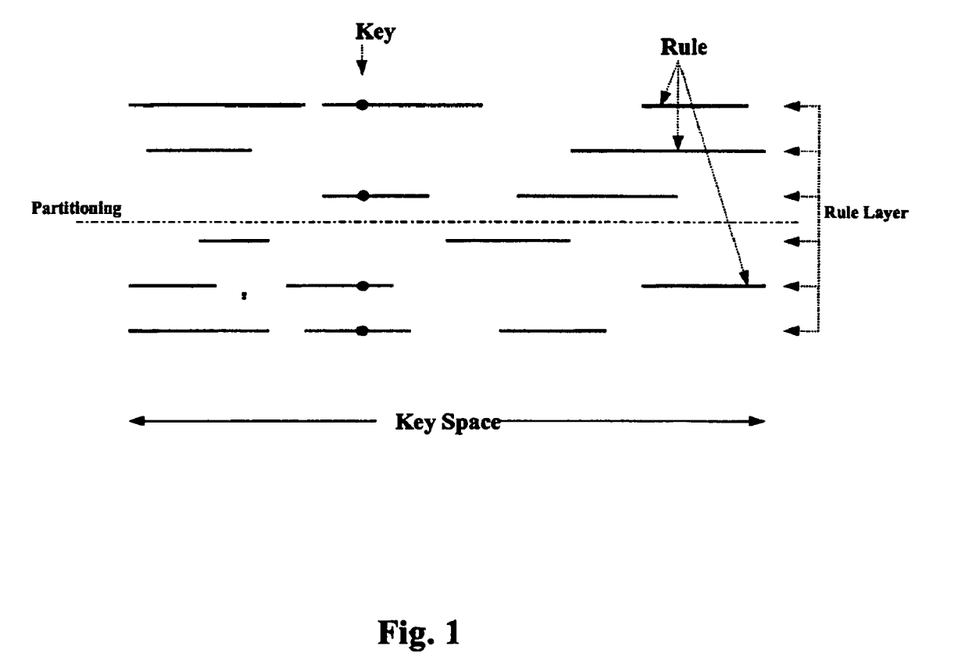
FIG. 1 is a diagram of a H-Cut partitioning method.

The H-Cut is shown in FIG. 1. In FIG. 1, Key represents a point, which is the relevant heading information of an IP packet. Rule refers to the rule in a rule set. Rule Layer is a set of rules, in which there is no overlap between the inner-Layer rules, but there may be overlap between the inter-Layer rules. Note that the overlap here refers to overlap on one field, such as the source address.

In FIG. 1, H-Cut divides a rule set into two smaller rule sets. Within the two smaller rule sets, the overlap between the rules are reduced, thereby the memory requirement is reduced. But for searching a key, all the smaller rule sets still need to be traversed, which affects the lookup speed in some extent negatively.

H-Cut can reduce the memory requirement, but will affect the lookup speed negatively.

In particular, H-Cut can have the following operation methods.

a) Range Interval Based Partitioning [1]

What is shown in FIG. 1 belongs to this kind of partitioning method. This method is applicable to each field (source network address, destination network address, source port, destination port, protocol field) of the rule. The value range of the field of a rule is represented by a range interval. Then the range interval corresponding to the rule is traversed, and simple increment method (initially, a subset is set as null, and in turn, range interval is added incrementally. If there is overlap between a range interval that will be added and the subset, a new subset is established and this range interval will be added into this new subset) is used to obtain several non-overlapped rule sets (the range intervals corresponding to the rules in the set do not overlap).

b) Prefix Level Based Partitioning [3]

This partitioning method is applicable to the source network address field and destination network address field of the rule. The partitioning method constructs a prefix tree based on the source or destination network address. In a prefix tree, the network address corresponds to different prefix levels, and the network address of different prefix levels do not overlap. Based on the prefix level corresponding to the network address, a rule set is divided into several non-overlapped rule subsets (the rule subsets do not overlap at selected network address field).

Vertical Cut (V-Cut)

Figure 2:
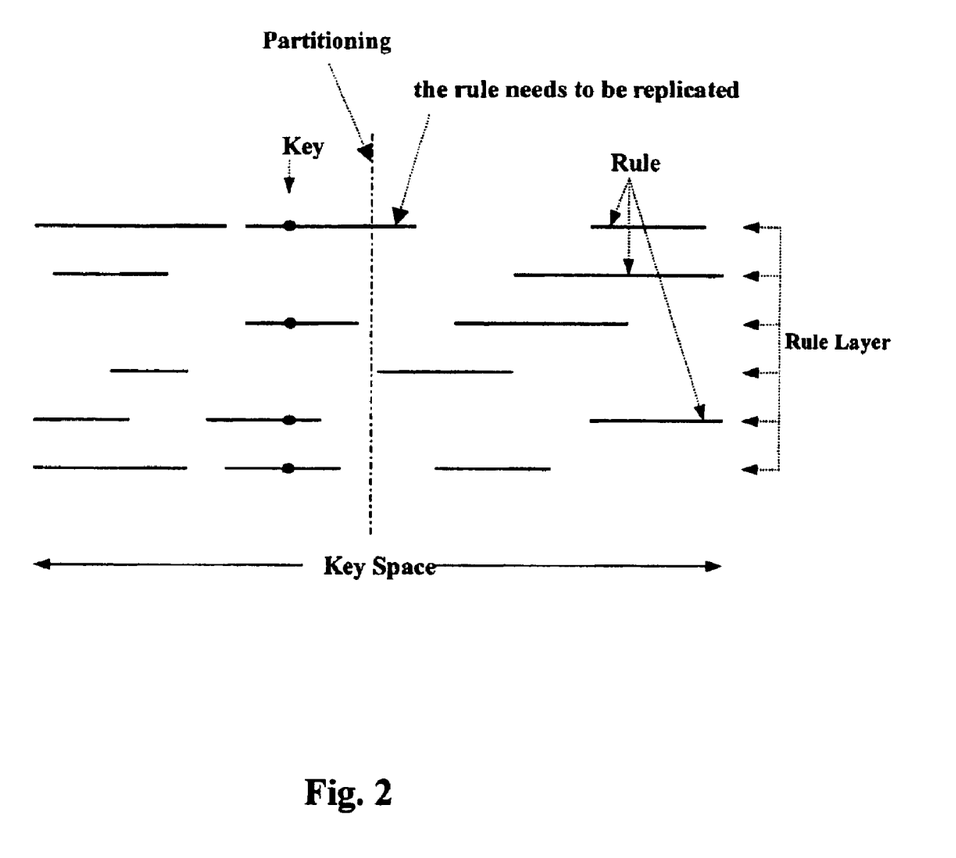
FIG. 2 is a diagram of a V-Cut partitioning method.

In FIG. 2, V-Cut also divides a rule set into two smaller rule sets. For searching a key, it only needs to be done in one smaller rule set, which improves the search performance. But the rule cut by the V-Cut needs to be copied into the two smaller rule sets respectively, which affects the memory requirement negatively.

V-Cut can improve the search performance, but will affect the memory requirement negatively.

In particular, V-Cut can have the following operation methods.

a) Range Interval Based Partitioning

What is shown in FIG. 2 belongs to this partitioning method. This method is applicable to each field of the rule. The value range of the field of a rule is represented by a range interval. A series of thresholds are selected. There is one threshold in FIG. 2 (which will be taken as an example in the following). The threshold and the range interval are compared, and a rule set is divided into two rule subsets. If all the values in the range interval of the rule are greater than the threshold, then this rule will be divided into a "greater than threshold" subset; if all the values in the range interval of the rule are smaller than the threshold, then this rule will be divided into a "smaller than threshold" subset; if the threshold is within the range interval of the rule, this rule needs to be replicated into two copies, one for the "greater than threshold" subset and one for the "smaller than threshold" subset.

b) ID BIT Based Partitioning [2]

This method is also applicable to each field of the rule. The value of the field of a rule is represented by a bit string. The bits in a series of bit strings are selected (Here, take one bit as an example). The value of the field of the rule at this bit is checked to see if it is 1, 0 or wildcard. If the value of the bit is 1, this rule will be divided into the "bit 1" subset; if the value of the bit is 0, this rule will be divided into the "bit 0" subset; and if the value of the bit is wildcard, this rule needs to be replicated into two copies, one for the "bit 0" subset and one for the "bit 1" subset.

SUMMARY OF THE INVENTION

To overcome the drawbacks in the prior art, the method which will be further described in detail in the following can be employed to partition a rule set. The method combines the H-Cut and V-Cut set partitioning methods and divides a rule set into several smaller rule sets, then uses a lookup in several smaller rule sets to substitute the original lookup in one rule set, thereby achieves the purpose of improving performance.

According to one aspect of the invention, there is provided a rule set partitioning based packet classification method for Internet, comprising: performing Horizontal Cut for the rule set; and performing Vertical Cut for the rule set.

The method according to the invention, wherein the step of performing Horizontal Cut for the rule set comprising:

determining the field for partitioning a rule layer based on a target algorithm and selecting the partition manner of the Horizontal Cut.

The method according to the invention, wherein, Horizontal Cut is performed according to the selected partition manner of the Horizontal Cut, thereby obtaining more than one rule layers, each rule layer being a Horizontal subset (H subset).

The method according to the invention, wherein, within one rule layer, there is no overlap between the rules on the field for Horizontal Cut.

The method according to the invention, wherein, combining the rule layers to obtain a plurality of Horizontal subsets according to the total number of the pre-designated Horizontal subsets and a predefined principle.

The method according to the invention, wherein the total number of the combined plurality of Horizontal subsets is equal to the total number of the pre-designated Horizontal subsets.

The method according to the invention, wherein, performing Vertical Cut in each of the Horizontal subsets.

The method according to the invention, the predefined principle is a principle of maximizing Vertical subsets.

The method according to the invention, the predefined principle is a principle of reducing replication.

The method according to the invention, the step of performing Vertical Cut further comprising: maximizing the total number of the generated Vertical subsets on the premise that replication will not be generated.

The method according to the invention, the step of performing Vertical Cut further comprising: determining a maximum replication threshold, and performing said Vertical Cut based on this threshold, to minimize the number of the rules that produce replication and make the number lower than this threshold.

The method according to the invention, wherein, forming a Hash table that can index the Vertical subsets for lookup.

The method according to the invention, rule storage is realized in each Vertical subset (V subset) respectively according to the target algorithm.

The method according to the invention, wherein the determined field for partitioning a rule layer is selected from those fields which are not used by the target algorithm.

The method according to the invention, wherein the target algorithm is an EGT algorithm.

The method according to the invention, wherein taking a source address field and a destination address field as the main classification basis, and selecting a source port or a destination port as the field for partitioning a rule layer, the partitioning manner of the Horizontal Cut being a range interval based partitioning.

According to another aspect of the invention, there is provided a method for performing a lookup by using the rule subset obtained from the above described method, comprising:

searching a Hash table based on a keys to find a set of the multiple Vertical subsets corresponding to the keys;

searching the multiple Vertical subsets in parallel or serially; and selecting the ultimate search result from the search results of the multiple Vertical subsets based on the priority.

DETAILED DESCRIPTION OF THE PREFERRED EMBODIMENTS

Both H-Cut and V-Cut are methods for partitioning a set, but each has its advantages and drawbacks. By combining the two kinds of partitioning methods together organically, they can complement to each other in some extent, thereby overcome respective drawbacks.

Figure 3:
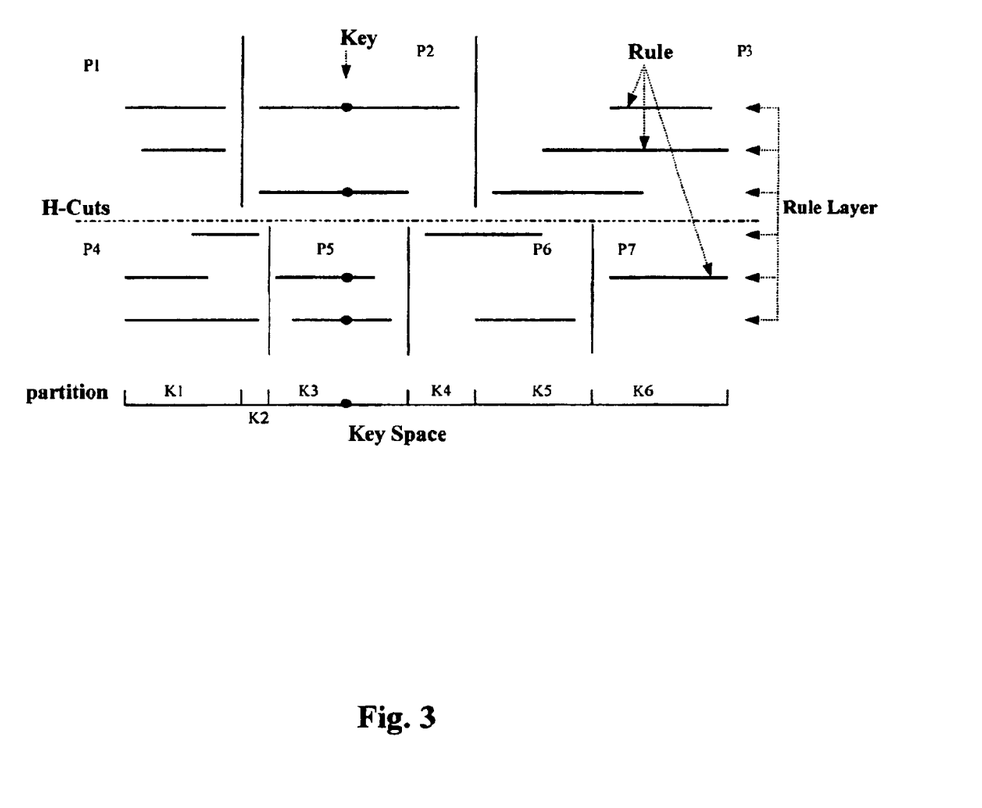
FIG. 3 is a diagram of a method that combines the H-Cut partitioning and the V-Cut partitioning according to the invention.
Figure 4:
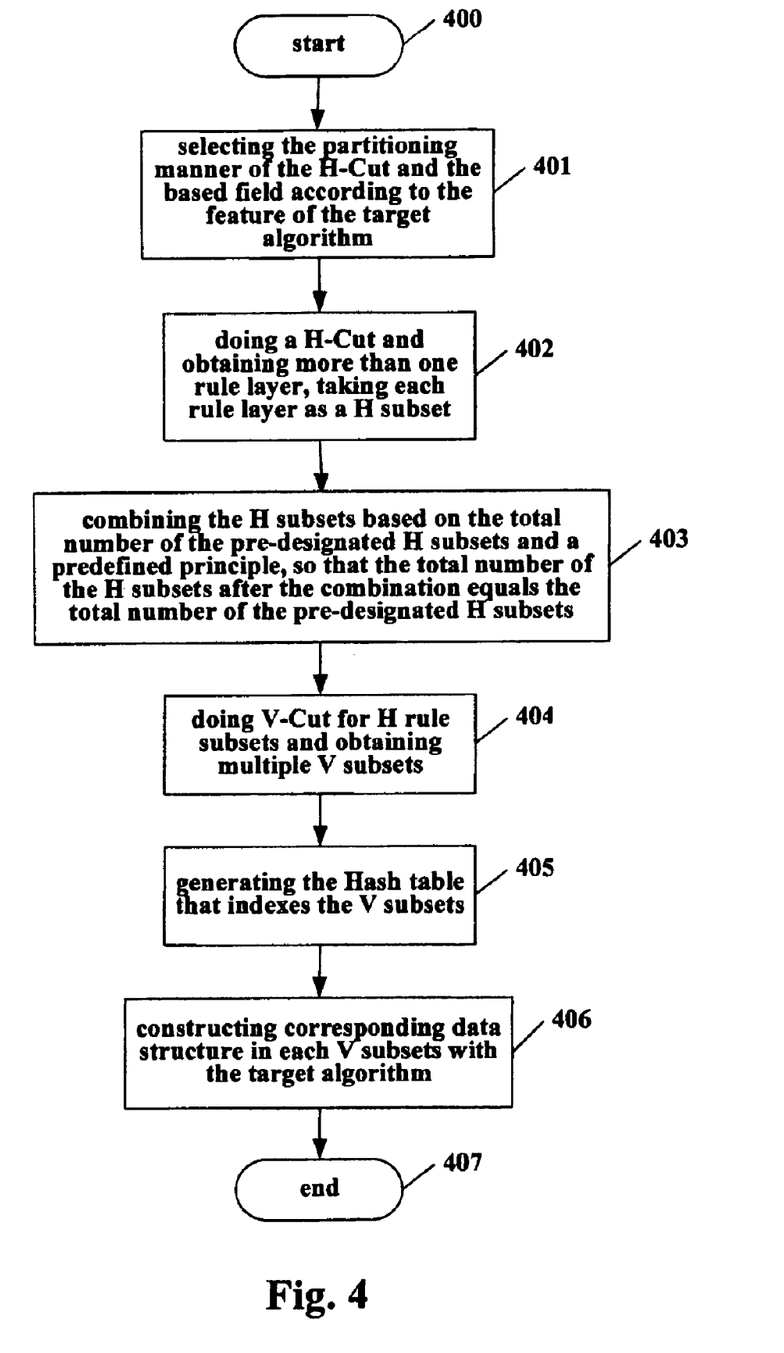
FIG. 4 is a flowchart of the partitioning method according to the invention.

FIG. 3 is a diagram that combines the H-Cut partitioning and the V-Cut partitioning according to the invention. As shown in FIG. 3, firstly a H-Cut partitioning is done, then a V-Cut partitioning is done in the two subsets respectively, thus the V-Cut's replication has been eliminated (if only V-Cut is done, replication will always exist regardless of how to partition). After H-Cuts and V-Cuts, the original set is divided into 7 non-intersected atom subsets $\{P_1, P_2, \ldots, P_7\}$; 5 (top 2, bottom 3) V-Cuts divide the Key Space into 6 portions $\{K1, K2, K3, K4, K5, K6\}$; the corresponding atom subsets is as follows:

$\{K_1=P_1 \cup P_4, \quad K_2=P_2 \cup P_4, \quad K_3=P_2 \cup P_5, \quad K_4=P_2 \cup P_6, K=P_3 \cup P_6, K_6=P_3 \cup P_7\}$ FIG. 4 shows a flowchart of partitioning a set according to the invention. Next, each step will be further explained.

According to one embodiment of the invention, there is provided a rule set partitioning based packet classification method for Internet. The method starts at Step 400. Next at Step 401, the partitioning manner (operation method) of the H-Cut is selected based on the feature of the target algorithm, and the field for partitioning a rule layer is determined (generally, it is selected from those fields that are not used by the target algorithm). The target algorithm decides the partitioning manner and the field for the H-Cut. For example, for the EGT algorithm that will be illustrated later, since it uses the source address field/destination address field as the main classification basis, the source port (or destination port) is chosen as the field for partitioning a rule layer. In addition, the range interval based partitioning method is selected as the operation method for the H-Cut.

Then, at Step 402, a H-Cut is done based on the selected operation method for the H-Cut and more than one rule layers (the rule within each rule layer does not overlap on the field for Horizontal Cut, which is guaranteed by the operation method) are obtained. Each rule layer is a H subset. Please see the following example for its detail operation;

Then, at Step 404, a V-Cut is done in each H subset, the principle is to produce as many V subset as possible on the premise that replication will not be generated (two V-Cut operation methods have been described above. For the range interval partitioning method, 'replication will not be generated' refers to that, when selecting a threshold, it is ensured that the range interval corresponding to the rule in the H subset does not intersect with the threshold, that is, greater or smaller than the threshold. For the ID Bit partitioning method, 'replication will not be generated' refers to that, where selecting a bit position, it is ensured that there is no wildcard at the bit position corresponding to the bit string of the rule in the H subset, that is, it can only be bit 0 or bit 1).

Then, at Step 405, all the V-Cut partitioning divides the original set into multiple portions (namely, multiple V subsets, see FIG. 3). A Hash Table that can index the V subsets is formed for using in a lookup (the form of the Hash Table can be obtained as follows: the thresholds of all the V-Cut partitioning are listed, the whole range interval is divided into several portions by using the thresholds, each portion being a small segment of the range interval, and the Hash Table for looking up by index small segments of the range interval is formed according to these small segments).

Then, at Step 406, rule storage is realized in each V subset respectively according to the target algorithm.

The method ends at Step 407.

Preferably, the above method can add Step 403 after Step 402 but before Step 404. In Step 403, the rule layers can be combined to obtain several H subsets based on the total number of the pre-designated H subsets and a predefined principle, so that the total number of the H subsets after the combination equals the total number of the pre-designated H subsets. The detailed example is as follow.

The predefined principle can be determined based on requirement. In the present embodiment, said predefined principle use a principle that maximize the Vertical subsets, which can be implemented through the following steps of: traversing all the possible combination schemes, comparing the number of the subsets produced by the V-Cut partitioning in each scheme, and taking the scheme with maximum V-Cut subsets as the ultimate combination scheme.

According to another embodiment of the invention, there is provided another rule set partitioning based packet classification method for Internet, which is similar to the embodiment described in conjunction with FIG. 4 in the above. The difference lies in that:

1. A reducing replication principle is used as said predefined principle, which can be implemented through the following steps of: traversing all the possible combination schemes, comparing the number of the replication rules produced after V-Cut in each scheme, and taking the scheme with the least number of replication as the ultimate combination scheme.

2. In the embodiment of said reducing replication principle, the implementation corresponding to Step 404 in FIG. 4 includes steps of: determining a maximal replication threshold and performing V-Cut based on this threshold, so as to minimize the number of the rules that produce replication and make the number lower than this threshold.

Other content is the same as that of the embodiment described in conjunction with FIG. 4 in the above.

Figure 5:
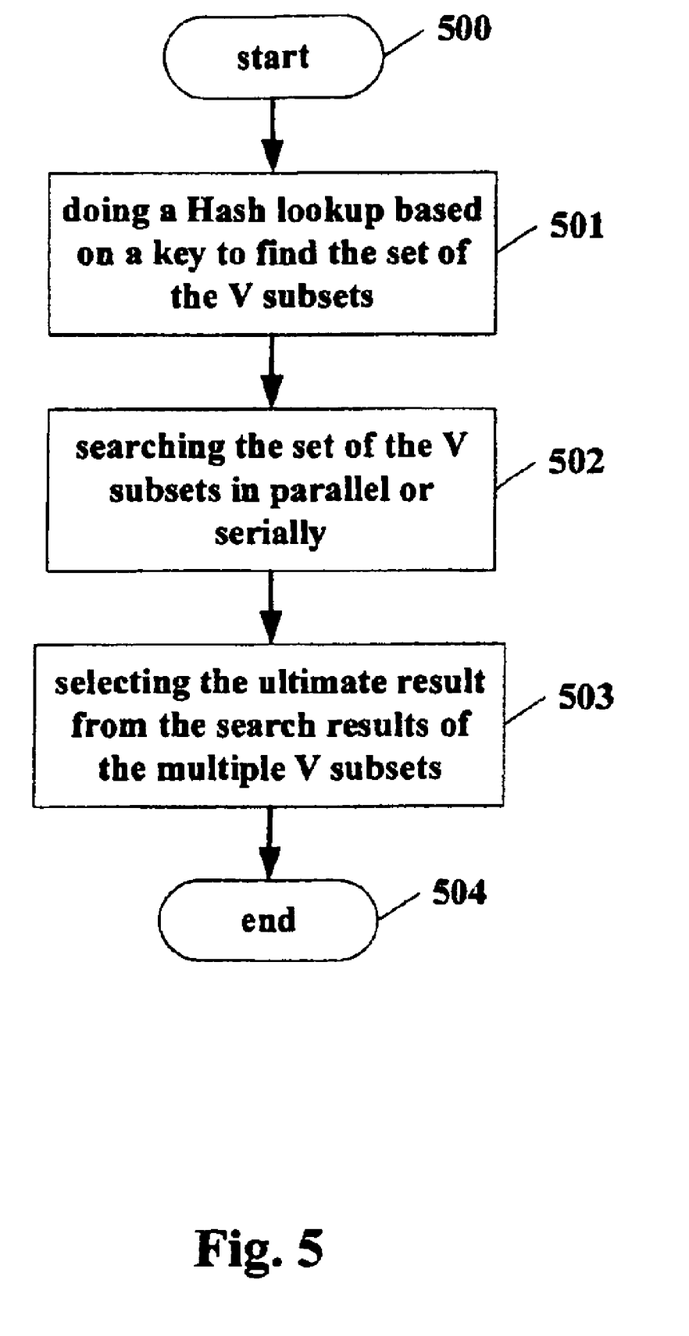
FIG. 5 is a flowchart of the lookup method according to the invention.

FIG. 5 shows a lookup flow after partitioning a set according to the invention.

As shown in FIG. 5, the lookup method starts at Step 500. Next, in Step 501, a Hash table is searched based on a key to find the set of the V subsets (multiple V subsets) corresponding to the key.

Next, at Step 502, the multiple V subsets are searched in parallel or serially.

Finally, at Step 503, the ultimate search result is selected from the search results of the multiple V subsets based on the priority. The lookup method ends at Step 504.

In order to describe the invention better, next, for a specific algorithm EGT [4], detailed operation flow is given.

Rule Set

First, the rule set shown in Table 1 is given. In Table 1, RULES represents rule. A,B,C,D . . . in column RULES represents the number of the rule. DIP represents destination network address field. SIP represents source network address field. SP represents source port field. DP represents destination port field. PORT represents protocol field. Priority represents the priority of the rule.

The "*" in all the tables in the present specification represents a wildcard.

TABLE 1

| Rules | DIP | SIP | SP | DP | PROT | Priority |
|---|---|---|---|---|---|---|
| A | * | 00* | 0-135 | 0-1024 | TCP | 1 |
| B | 0* | 10* | 0-109 | 0-65535 | ICMP | 2 |
| C | * | 00* | 0-137 | 0-1024 | UDP | 3 |
| D | 00* | 11* | 109-1024 | 80-80 | UDP | 4 |
| E | * | 00* | 1025-5555 | 135 | UDP | 5 |
| F | 00* | 11* | 0-1024 | 1025-65535 | TCP | 6 |
| G | 00* | 1* | 1098-1723 | 0-65535 | TCP | 7 |
| H | 0* | 01* | 1025-6000 | 2048-6000 | TCP | 8 |
| I | 00* | 11* | 0-1024 | 1025-65535 | OSPF | 9 |
| J | 0* | 10* | 6000-65535 | 137-139 | * | 10 |

TABLE 1-continued

| Rules | DIP | SIP | SP | DP | PROT | Priority |
|---|---|---|---|---|---|---|
| K | 111 | 000 | 137-5550 | 0-65535 | TCP | 11 |
| L | 111 | 000 | 137-2048 | 109-1024 | UDP | 12 |
| M | * | 00* | 5600-65535 | 20-21 | * | 13 |
| N | 10* | 1* | 6789-65535 | 0-1024 | TCP | 14 |
| O | 10* | 1* | 5600-6800 | 0-65535 | UDP | 15 |

TABLE 2

| Layer 1 | A[0-135] | | K[137-5550] | | J[6000-65535] |
| Layer 2 | B[0-109] | | | | M[5600-65535] |
| Layer 3 | C[0-137] | | E[1025-5555] | | N[6789-65535] |
| Layer 4 | | D[109-1024] | | H[1025-6000] | |
| Layer 5 | F&I[0-1024] | | G[1098-1723] | | |
| Layer 6 | | | L[137-2048] | | O[5600-6800] |

Note:
items in gray represents that the range interval contains more than one rule, and the same applies in the following.

Flow for Partitioning a Rule

1) The EGT algorithm uses the two SIP/DIP as the main classification basis, therefore, SP, (or DP) is selected as the basis for Horizontal partitioning (corresponding to Step 401 in the above describes partitioning method).

2) Based on the SP, 15 rules are divided as being on 6 layers (corresponding to Step 402 in the above described partitioning method), as shown in Table 2 in the above.

3) If the tolerable replication threshold for determining V-cuts partitioning is 0, and the predefined number of the H subset is 2, we combine the layers and obtain the following H-cut scheme, namely, as shown in the following Table 3, the layers 1, 2 and 6 compose one H subset, while the layers 3, 4 and 5 compose another H subset (corresponding to Step 403 in the above described partitioning method.

TABLE 3

| Layer 1 | A[0-135] | | K[137-5550] | | J[6000-65535] |
| Layer 2 | B[0-109] | | | | M[5600-65535] |
| Layer 6 | | | L[137-2048] | | O[5600-6800] |

SP = 135        SP = 5550

| Layer 3 | C[0-137] | | E[1025-5555] | | N[6789-65535] |
| Layer 4 | | D[109-1024] | | H[1025-6000] | |
| Layer 5 | F&I[0-1024] | | G[1098-1723] | | |

SP = 1024        SP = 6000

4) V-Cut is performed at all the positions that will not produce V-Cut replication in the H subset. As shown in Table 3, the black dashed lines represent V-Cuts and 6 V subsets are obtained; in addition, based on the protocol field (TCP or Not TCP), further V-Cuts can be done for the obtained V subsets. Finally eight V subsets P1, P2, . . . , P8 (corresponding to Step 404 in the above described partitioning method) are obtained, as shown in the following Table 4.

TABLE 4

| | Hash lookup condition | | Rule in subset | | | | | |
|---|---|---|---|---|---|---|---|---|
| Sub-set | Source port | Protocol field | Layer 1 | Layer 2 | Layer 3 | Layer 4 | Layer 5 | Layer 6 |
| P1 | 0-135 | * | A | B | | | | |
| P2 | 136-5550 | * | K | | | | | L |
| P3 | 5551-65535 | * | J | M | | | | O |
| P4 | 0-1024 | TCP | | | | D | I | |
| P5 | 0-1024 | Not TCP | | | C | | F | |
| P6 | 1025-6000 | TCP | | | | H | G | |
| P7 | 1025-6000 | Not TCP | | | E | | | |
| P8 | 6001-65535 | * | | | N | | | |

TABLE 5

| | Hash lookup condition | | Lookup subset |
|---|---|---|---|
| Partitioning | Source port | Protocol field | Set group |
| K1 | 0-135 | TCP | P1 ∪ P4 |
| | | Not TCP | P1 ∪ P5 |
| K2 | 136-1024 | TCP | P2 ∪ P4 |
| | | Not TCP | P2 ∪ P5 |
| K3 | 1025-5550 | TCP | P2 ∪ P6 |
| | | Not TCP | P2 ∪ P7 |
| K4 | 5551-6000 | TCP | P3 ∪ P6 |
| | | Not TCP | P3 ∪ P7 |
| K5 | 6001-65535 | * | P3 ∪ P8 |

5) The above partitioned V subsets are adjusted and then an index Hashing Table is obtained. In particular, 4 small segments of range interval are obtained based on the 4 thresholds (sp=135, sp=1024, sp=5550, sp=6000). Further, in each small segment of range interval, the rule is partitioned based on the protocol field. Finally, the Hash table is obtained, as shown in FIG. 5.

Figure 6:
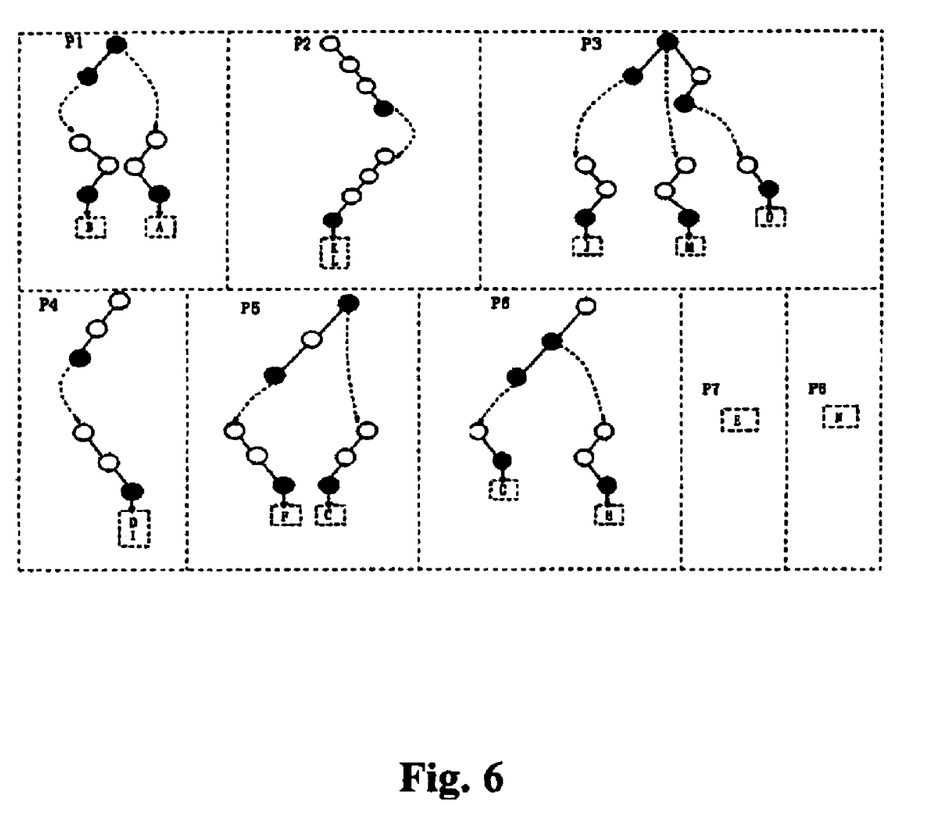
FIG. 6 is a diagram of realizing a data structure by utilizing the EGT algorithm according to one embodiment of the invention.

6) In each V subset, the EGT algorithm is used to realize a data structure, as shown in FIG. 6.

Lookup Flow

Figure 7:
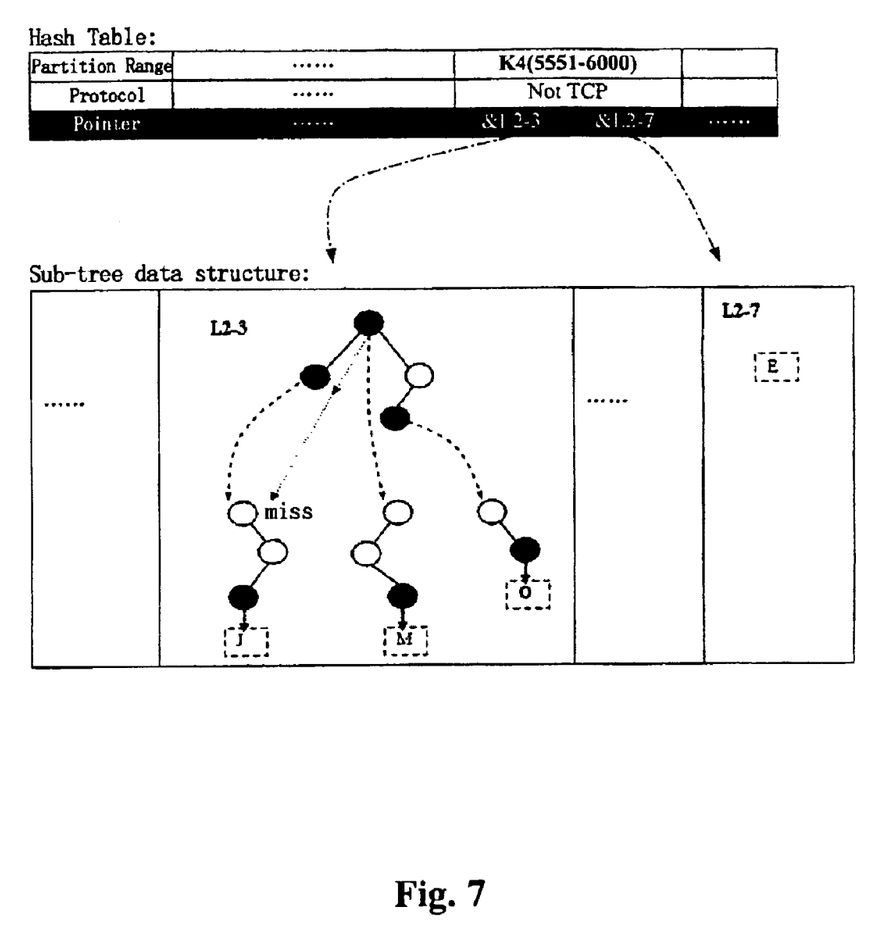
FIG. 7 is a diagram of the lookup process according to one embodiment of the invention.

FIG. 7 shows the lookup process for the key {000,010, 5580, 6001, UDP} (schematic diagram).

1. The source port (SP) and protocol field <5800, UDP> of the key are sent to the Hash Table to do a Hash lookup, entry "K4-Not TCP" is hit, and two pointers &P3 and &P7 are obtained. In FIG. 7, a miss represents that the lookup for the current node fails.

2. The two EGT subsets P3 and P7 are accessed respectively by using the destination address/source address (DIP/SIP) of the key;

3. From the search result of P3 and P7 subsets, select E as the ultimate matching rule.

The rule set pre-partitioning based packet classification method of the invention has been described above through specific embodiments, those skilled in the art can appreciate that various changes and modifications can be made to the invention without departing from the spirit and scope of the invention.

The invention claimed is:

1. A method for generating a partitioned rule set for use in classifying a packet for a communications network, the method comprising executing the following steps:

obtaining a rule set comprising a plurality of rules, the plurality of rules being used to classify a packet for the communications network;

partitioning the rule set into a plurality of horizontal subsets in accordance with a classification operation and a field associated with the rule set, a given horizontal subset comprising one or more rule layers, each of the one or more rule layers comprising one or more of the plurality of rules;

partitioning at least a first and a second of the plurality of horizontal subsets into a plurality of vertical subsets, wherein, within a given one of the plurality of horizontal subsets, a first vertical subset range interval of a given one of the plurality of vertical subsets is non-overlapping with a second vertical subset range interval of another given one of the plurality of vertical subsets;

creating a plurality of non-overlapping partitions across a range interval of the rule set, a given one of the non-overlapping partitions corresponding to values which are within each of a set of vertical subset range intervals comprising one vertical subset within at least the first and the second of the horizontal subsets; and generating a hash table that indexes the plurality of vertical subsets in accordance with the plurality of non-overlapping partitions, wherein a given vertical subset is grouped together with a given partition in accordance with a corresponding range interval of the given vertical subset.

2. The method of claim 1, further comprising the step of combining a given one or more horizontal subsets into a given horizontal subset in accordance with a total number of pre-designated horizontal subsets and a predefined principle.

3. The method of claim 1, wherein a value range of the field of a given one of the one or more of the plurality of rules is represented by a rule range interval, and wherein, within any given rule layer, a rule range interval of a given one of the plurality of rules is non-overlapping with another rule range interval of another given one of the plurality of rules.

4. The method of claim 1, wherein each of the plurality of rules comprises at least one of a source network address, a destination network address, a source port, a destination port, a protocol, a priority, and an action.

5. The method of claim 1, wherein the classification operation is configured to determine the field to be used for partitioning and select a partition manner.

6. The method of claim 1, wherein the step of partitioning at least one of the plurality of horizontal subsets into the plurality of vertical subsets, further comprises at least one of maximizing a total number of the plurality of vertical subsets and minimizing a replication of one or more rules of the plurality of vertical subsets.

7. The method of claim 6, wherein the step of maximizing a total number of the plurality of vertical subsets further comprises:

generating a plurality of combinations of one or more vertical subsets;

comparing the plurality of combinations in accordance with a number of vertical subsets; and selecting the combination of one or more vertical subsets with a highest number of vertical subsets.

8. The method of claim 6, wherein the step of minimizing a replication of one or more rules of the plurality of vertical subsets further comprises:

generating a plurality of combinations of one or more vertical subsets;

comparing the plurality of combinations in accordance with a number of rule replications; and selecting the combination of one or more vertical subsets with a lowest number of rule replications.

9. The method of claim 6, wherein the step of minimizing a replication of one or more rules of the plurality of vertical subsets further comprises:

determining a maximum replication threshold; and partitioning at least one of the plurality of horizontal subsets into the plurality of vertical subsets in accordance with the maximum replication threshold.

10. The method of claim 1, further comprising the step of realizing rule storage in each of the plurality of vertical subsets according to the classification operation.

11. The method of claim 1, wherein the step of partitioning the rule set into the plurality of horizontal subsets is in accordance with at least one of a range interval based partitioning and a prefix level based partitioning.

12. The method of claim 1, wherein the step of partitioning each of the plurality of horizontal subsets into the plurality of vertical subsets is in accordance with at least one of a range interval based partitioning and an IB BIT based partitioning.

13. The method of claim 1, wherein the classification operation is an EGT algorithm.

14. The method of claim 13, wherein the classification operation partitions the rule set into the plurality of horizontal subsets in accordance with at least one of a source port and a destination port.

15. The method of claim 1, further comprising the steps of:

searching the hash table based on one or more keys to find a set of one or more vertical subsets corresponding to the one or more keys;

searching the set of one or more vertical subsets in parallel or serially; and selecting a matching rule from the searched set of one or more vertical subsets in accordance with a priority.

16. The method of claim 1, wherein the partitioning of the first horizontal subset into a plurality of vertical subsets differs from the partitioning of the second horizontal subset into a plurality of vertical subsets.

17. The method of claim 1, wherein a number of vertical subsets within the first horizontal subsets differs from a number of vertical subsets within the second horizontal subsets.

18. A method for classifying a packet for a communications network, the method comprising executing the following steps:

obtaining a packet from the communications network;

classifying the packet based on a partitioned rule set, wherein the partitioned rule set is generated by:

obtaining a rule set comprising a plurality of rules, the plurality of rules being used to classify the packet for the communications network;

partitioning the rule set into a plurality of horizontal subsets in accordance with a classification operation and a field associated with the rule set, a given horizontal subset comprising one or more rule layers, each of the one or more rule layers comprising one or more of the plurality of rules;

partitioning at least a first and a second of the plurality of horizontal subsets into a plurality of vertical subsets, wherein, within a given one of the plurality of horizontal subsets, a first vertical subset range interval of a given one of the plurality of vertical subsets is non-overlapping with a second vertical subset range interval of another given one of the plurality of vertical subsets;

creating a plurality of non-overlapping partitions across a range interval of the rule set, a given one of the non-overlapping partitions corresponding to values which are within each of a set of vertical subset range intervals comprising one vertical subset within at least the first and the second of the horizontal subsets; and generating a hash table that indexes the plurality of vertical subsets in accordance with the plurality of non-overlapping partitions, wherein a given vertical subset is grouped together with a given partition in accordance with a corresponding range interval of the given vertical subset.

19. The method of claim 18, wherein the step of partitioning at least one of the plurality of horizontal subsets into the plurality of vertical subsets, further comprises at least one of maximizing a total number of the plurality of vertical subsets and minimizing a replication of one or more rules of the plurality of vertical subsets.

20. A method for generating a partitioned rule set for use in classifying a packet for a communications network, the method comprising executing the following steps:

obtaining a rule set comprising a plurality of rules, the plurality of rules being used to classify a packet for the communications network;

partitioning the rule set into one or more horizontal subsets in accordance with a classification operation and a field associated with the rule set, a given horizontal subset comprising one or more rule layers, each of the one or more rule layers comprising one or more of the plurality of rules;

partitioning at least one of the one or more horizontal subsets into one or more vertical subsets, the one or more vertical subsets resulting in the creation of one or more partitions across a range interval of the rule set; and generating a hash table that indexes the one or more vertical subsets in accordance with the one or more partitions, wherein a given vertical subset is grouped together with a given partition in accordance with a corresponding range interval of the given vertical subset;

wherein the step of partitioning at least one of the one or more horizontal subsets into the one or more vertical subsets, further comprises at least one of maximizing a total number of the one or more vertical subsets and minimizing a replication of one or more rules of the one or more vertical subsets.

* * * * *